United States Patent
Eliaz

(10) Patent No.: US 8,548,072 B1
(45) Date of Patent: Oct. 1, 2013

(54) TIMING PILOT GENERATION FOR HIGHLY-SPECTRALLY-EFFICIENT COMMUNICATIONS

(71) Applicant: MagnaCom Ltd., Moshav Ben Shemen (IL)

(72) Inventor: Amir Eliaz, Moshav Ben Shemen (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 13/755,065

(22) Filed: Jan. 31, 2013

Related U.S. Application Data

(60) Provisional application No. 61/662,085, filed on Jun. 20, 2012, provisional application No. 61/726,099, filed on Nov. 14, 2012, provisional application No. 61/729,774, filed on Nov. 26, 2012, provisional application No. 61/747,132, filed on Dec. 28, 2012.

(51) Int. Cl.
*H04L 27/00* (2006.01)

(52) U.S. Cl.
USPC .......................................................... 375/259

(58) Field of Classification Search
USPC .......................................................... 375/259
See application file for complete search history.

(56) References Cited

U.S. PATENT DOCUMENTS

| | | | | |
|---|---|---|---|---|
| 6,392,500 | B1 * | 5/2002 | McCallister et al. | 332/103 |
| 6,507,628 | B1 * | 1/2003 | McCallister et al. | 375/341 |
| 2005/0201481 | A1 * | 9/2005 | Calderbank et al. | 375/265 |

OTHER PUBLICATIONS

S. Mita, M. Izumita, N. Doi, and Y. Eto, "Automatic equalizer for digital magnetic recording systems" IEEE Trans. Magn., vol. 25, pp. 3672-3674, 1987.
E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.
W. E. Ryan and A. Gutierrez, "Performance of adaptive Volterra equalizers on nonlinear magnetic recording channels," IEEE Trans. Magn., vol. 31, pp. 3054-3056, Nov. 1995.
X. Che, "Nonlinearity measurements and write precompensation studies for a PRML recording channel," IEEE Trans. Magn., vol. 31, pp. 3021-3026, Nov. 1995.
O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.
Equalization: The Correction and Analysis of Degraded Signals, White Paper, Agilent Technologies, Ransom Stephens V1.0, Aug. 15, 2005 (12 pages).

(Continued)

*Primary Examiner* — Juan A Torres
(74) *Attorney, Agent, or Firm* — McAndrews, Held & Malloy, Ltd.

(57) ABSTRACT

Methods and systems are provided for timing synchronization for reception of highly-spectrally efficient communications. An example method may include, mapping, in a transmitter, a plurality of transmit bits to a plurality of symbols at a symbol rate that is based on an oscillator signal. The plurality of symbols may be processed via a filter. The processing may result in an inter-symbol correlated (ISC) signal. The oscillator signal may be frequency divided to generate one or more pilot signals having a frequency that is a sub-harmonic of a frequency of the oscillator signal. The pilot signal may be injected into the ISC signal. The injecting may result in an ISC signal with timing carrier. The ISC signal with timing carrier may be transmitted. Gain of the one or more pilot signals may be adjusted based on a spectral mask value associated with the transmitting.

20 Claims, 6 Drawing Sheets

(56) References Cited

OTHER PUBLICATIONS

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

Intuitive Guide to Principles of Communications, www.complextoreal.com, Inter Symbol Interference (ISI) and Root-raised Cosine (RRC) filtering, (2002), pp. 1-23 (23 pages).

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. and Nudd, G.R., Department of Computer Science, Univ. of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G. D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog•Iu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686, Nov. 1989.

* cited by examiner

TIMING PILOT GENERATION FOR HIGHLY-SPECTRALLY-EFFICIENT COMMUNICATIONS

CLAIM OF PRIORITY

This patent application makes reference to, claims priority to and claims benefit from:
U.S. Provisional Patent Application Ser. No. 61/662,085 entitled "Apparatus and Method for Efficient Utilization of Bandwidth" and filed on Jun. 20, 2012;
U.S. Provisional Patent Application Ser. No. 61/726,099 entitled "Modulation Scheme Based on Partial Response" and filed on Nov. 14, 2012;
U.S. Provisional Patent Application Ser. No. 61/729,774 entitled "Modulation Scheme Based on Partial Response" and filed on Nov. 26, 2012; and
U.S. Provisional Patent Application Ser. No. 61/747,132 entitled "Modulation Scheme Based on Partial Response" and filed on Dec. 28, 2012.

Each of the above-identified applications is hereby incorporated herein by reference in its entirety.

INCORPORATION BY REFERENCE

This patent application also makes reference to:
U.S. patent application Ser. No. 13/754,964 titled "Low-Complexity, Highly-Spectrally-Efficient Communications," and filed on the same date as this application;
U.S. patent application Ser. No. 13/754,998 titled "Design and Optimization of Partial Response Pulse Shape Filter," and filed on the same date as this application;
U.S. patent application Ser. No. 13/755,001 titled "Constellation Map Optimization For Highly Spectrally Efficient Communications," and filed on the same date as this application;
U.S. patent application Ser. No. 13/755,008 titled "Dynamic Filter Adjustment for Highly-Spectrally-Efficient Communications," and filed on the same date as this application;
U.S. patent application Ser. No. 13/755,011 titled "Timing Synchronization for Reception of Highly-Spectrally-Efficient Communications," and filed on the same date as this application;
U.S. patent application Ser. No. 13/755,018 titled "Feed Forward Equalization for Highly-Spectrally-Efficient Communications," and filed on the same date as this application;
U.S. patent application Ser. No. 13/755,021 titled "Decision Feedback Equalizer for Highly-Spectrally-Efficient Communications," and filed on the same date as this application;
U.S. patent application Ser. No. 13/755,025 titled "Decision Feedback Equalizer with Multiple Cores for Highly-Spectrally-Efficient Communications," and filed on the same date as this application;
U.S. patent application Ser. No. 13/755,026 titled "Decision Feedback Equalizer Utilizing Symbol Error Rate Biased Adaptation Function for Highly-Spectrally-Efficient Communications," and filed on the same date as this application;
U.S. patent application Ser. No. 13/755, 028 titled "Coarse Phase Estimation for Highly-Spectrally-Efficient Communications," and filed on the same date as this application;
U.S. patent application Ser. No. 13/755,039 titled "Fine Phase Estimation for Highly Spectrally Efficient Communications," and filed on the same date as this application; and
U.S. patent application Ser. No. 13/755,043 titled "Joint Sequence Estimation of Symbol and Phase with High Tolerance of Nonlinearity," and filed on the same date as this application.

Each of the above stated applications is hereby incorporated herein by reference in its entirety.

TECHNICAL FIELD

Aspects of the present application relate to electronic communications.

BACKGROUND

Existing communications methods and systems are overly power hungry and/or spectrally inefficient. Further limitations and disadvantages of conventional and traditional approaches will become apparent to one of skill in the art, through comparison of such approaches with some aspects of the present method and system set forth in the remainder of this disclosure with reference to the drawings.

BRIEF SUMMARY

Methods and systems are provided for timing pilot generation for highly-spectrally-efficient communications, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
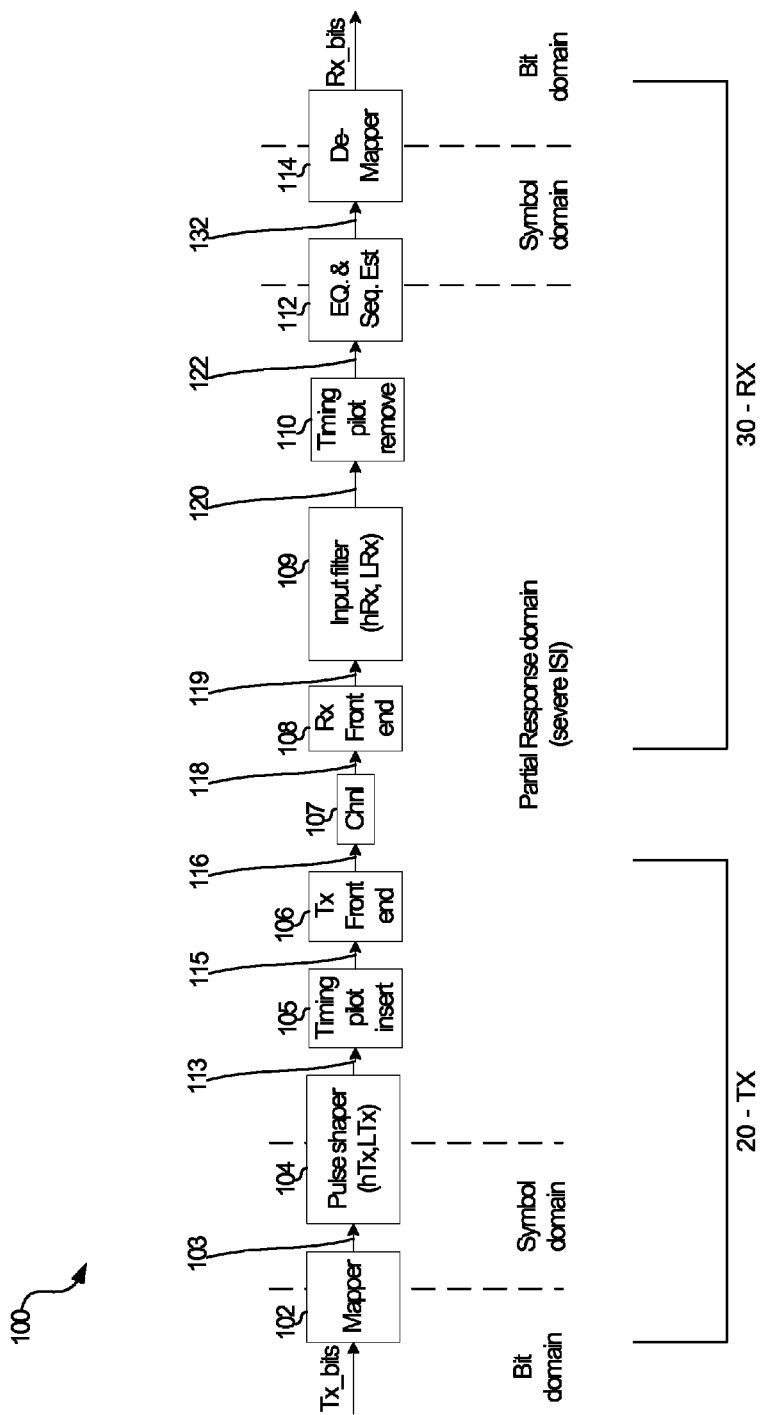
FIG. 1 is a block diagram depicting an example system configured for low-complexity, highly-spectrally-efficient communications.

FIG. 1 is a block diagram depicting an example system configured for low-complexity, highly-spectrally-efficient communications. The system 100 comprises a mapper circuit 102, a pulse shaping filter circuit 104, a timing pilot insertion circuit 105, a transmitter front-end circuit 106, a channel 107, a receiver front-end 108, a filter circuit 109, a timing pilot removal circuit 110, an equalization and sequence estimation circuit 112, and a de-mapping circuit 114. The components 102, 104, 105, and 106 may be part of a transmitter (e.g., a base station or access point, a router, a gateway, a mobile device, a server, a computer, a computer peripheral device, a table, a modem, a set-top box, etc.), the components 108, 109, 110, 112, and 114 may be part of a receiver (e.g., a base station or access point, a router, a gateway, a mobile device, a server, a computer, a computer peripheral device, a table, a modem, a set-top box, etc.), and the transmitter and receiver may communicate via the channel 107.

The mapper 102 may be operable to map bits of the Tx_bitstream to be transmitted to symbols according to a selected modulation scheme. The symbols may be output via signal 103. For example, for an quadrature amplitude modulation scheme having a symbol alphabet of N (N-QAM), the mapper may map each $Log_2(N)$ bits of the Tx_bitstream to single symbol represented as a complex number and/or as in-phase (I) and quadrature-phase (Q) components. Although N-QAM is used for illustration in this disclosure, aspects of this disclosure are applicable to any modulation scheme (e.g., amplitude shift keying (ASK), phase shift keying (PSK), frequency shift keying (FSK), etc.). Additionally, points of the N-QAM constellation may be regularly spaced ("on-grid") or irregularly spaced ("off-grid"). Furthermore, the symbol constellation used by the mapper may be optimized for best bit-error rate performance that is related to log-likelihood ratio (LLR) and to optimizing mean mutual information bit (MMIB). The Tx_bitstream may, for example, be the result of bits of data passing through a forward error correction (FEC) encoder and/or an interleaver. Additionally, or alternatively, the symbols out of the mapper 102 may pass through an interleaver.

The pulse shaper 104 may be operable to adjust the waveform of the signal 103 such that the waveform of the resulting signal 113 complies with the spectral requirements of the channel over which the signal 113 is to be transmitted. The spectral requirements may be referred to as the "spectral mask" and may be established by a regulatory body (e.g., the Federal Communications Commission in the United States or the European Telecommunications Standards Institute) and/or a standards body (e.g., Third Generation Partnership Project) that governs the communication channel(s) and/or standard(s) in use. The pulse shaper 104 may comprise, for example, an infinite impulse response (IIR) and/or a finite impulse response (FIR) filter. The number of taps, or "length," of the pulse shaper 104 is denoted herein as LTx, which is an integer. The impulse response of the pulse shaper 104 is denoted herein as hTx. The pulse shaper 104 may be configured such that its output signal 113 intentionally has a substantial amount of inter-symbol interference (ISI). Accordingly, the pulse shaper 104 may be referred to as a partial response pulse shaping filter, and the signal 113 may be referred to as a partial response signal or as residing in the partial response domain, whereas the signal 103 may be referred to as residing in the symbol domain. The number of taps and/or the values of the tap coefficients of the pulse shaper 104 may be designed such that the pulse shaper 104 is intentionally non-optimal for additive white Gaussian noise (AWGN) in order to improve tolerance of non-linearity in the signal path. In this regard, the pulse shaper 104 may offer superior performance in the presence of non-linearity as compared to, for example, a conventional near zero positive ISI pulse shaping filter (e.g., root raised cosine (RRC) pulse shaping filter). The pulse shaper 104 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

It should be noted that a partial response signal (or signals in the "partial response domain") is just one example of a type of signal for which there is correlation among symbols of the signal (referred to herein as "inter-symbol-correlated (ISC) signals"). Such ISC signals are in contrast to zero (or near-zero) ISI signals generated by, for example, raised-cosine (RC) or root-raised-cosine (RRC) filtering. For simplicity of illustration, this disclosure focuses on partial response signals generated via partial response filtering. Nevertheless, aspects of this disclosure are applicable to other ISC signals such as, for example, signals generated via matrix multiplication (e.g., lattice coding), and signals generated via decimation below the Nyquist frequency such that aliasing creates correlation between symbols.

The timing pilot insertion circuit 105 may insert a pilot signal which may be utilized by the receiver for timing synchronization. The output signal 115 of the timing pilot insertion circuit 105 may thus comprise the signal 113 plus an inserted pilot signal (e.g., a sine wave at ¼×fbaud, where fbaud is the symbol rate). Put another way, the output signal 115 may comprise a partial response signal with timing carrier. An example implementation of the pilot insertion circuit 105 is described herein below in reference to FIGS. 4 and 5.

The transmitter front-end 106 may be operable to amplify and/or upconvert the signal 115 to generate the signal 116. Thus, the transmitter front-end 106 may comprise, for example, a power amplifier and/or a mixer. The front-end may introduce non-linear distortion and/or phase noise (and/or other non-idealities) to the signal 116. The non-linearity of the circuit 106 may be represented as FnlTx which may be, for example, a polynomial, or an exponential (e.g., Rapp model). The non-linearity may incorporate memory (e.g., Voltera series).

The channel 107 may comprise a wired, wireless, and/or optical communication medium. The signal 116 may propagate through the channel 107 and arrive at the receive front-end 108 as signal 118. Signal 118 may be noisier than signal 116 (e.g., as a result of thermal noise in the channel) and may have higher or different ISI than signal 116 (e.g., as a result of multi-path).

The receiver front-end 108 may be operable to amplify and/or downconvert the signal 118 to generate the signal 119. Thus, the receiver front-end may comprise, for example, a low-noise amplifier and/or a mixer. The receiver front-end may introduce non-linear distortion and/or phase noise to the signal 119. The non-linearity of the circuit 108 may be represented as FnlRx which may be, for example, a polynomial, or an exponential (e.g., Rapp model). The non-linearity may incorporate memory (e.g., Voltera series).

The timing pilot recovery and removal circuit 110 may be operable to lock to the timing pilot signal inserted by the pilot insertion circuit 105 in order to recover the symbol timing of the received signal. The output 122 may thus comprise the signal 120 minus (i.e., without) the timing pilot signal. An example implementation of the timing pilot recovery and removal circuit 110 is described in the United States patent application titled "Timing Synchronization for Reception of Highly-Spectrally-Efficient Communications," which is incorporated herein by reference, as set forth above.

The input filter 109 may be operable to adjust the waveform of the partial response signal 119 to generate partial response signal 120. The input filter 109 may comprise, for example, an infinite impulse response (IIR) and/or a finite impulse response (FIR) filter. The number of taps, or "length," of the input filter 109 is denoted herein as LRx, an integer. The impulse response of the input filter 109 is denoted herein as hRx. The number of taps, and/or tap coefficients of the input filter 109 may be configured based on: a non-linearity model, $\widehat{Fnl}$, signal-to-noise ratio (SNR) of signal 120, the number of taps and/or tap coefficients of the Tx partial response filter 104, and/or other parameters. The number of taps and/or the values of the tap coefficients of the input filter 109 may be configured such that noise rejection is intentionally compromised (relative to a perfect match filter) in order to improve performance in the presence of non-linearity. As a result, the input filter 109 may offer superior performance in the presence of non-linearity as compared to, for example, a conventional near zero positive ISI matching filter (e.g., root raised cosine (RRC) matched filter). The input filter 109 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

As utilized herein, the "total partial response (h)" may be equal to the convolution of hTx and hRx, and, thus, the "total partial response length (L)" may be equal to LTx+LRx−1. L may, however, be chosen to be less than LTx+LRx−1 where, for example, one or more taps of the Tx pulse shaper 104 and/or the Rx input filter 109 are below a determined level. Reducing L may reduce decoding complexity of the sequence estimation. This tradeoff may be optimized during the design of the system 100.

The equalizer and sequence estimator 112 may be operable to perform an equalization process and a sequence estimation process. Details of an example implementation of the equalizer and sequence estimator 112 are described below with respect to FIG. 2. The output signal 132 of the equalizer and sequence estimator 112 may be in the symbol domain and may carry estimated values of corresponding transmitted symbols (and/or estimated values of the corresponding transmitted information bits of the Tx_bitstream) of signal 103. Although not depicted, the signal 132 may pass through an interleaver en route to the de-mapper 114. The estimated values may comprise soft-decision estimates, hard-decision estimates, or both.

The de-mapper 114 may be operable to map symbols to bit sequences according to a selected modulation scheme. For example, for an N-QAM modulation scheme, the mapper may map each symbol to $\log_2(N)$ bits of the Rx_bitstream.

The Rx_bitstream may, for example, be output to a de-interleaver and/or an FEC decoder. Alternatively, or additionally, the de-mapper 114 may generate a soft output for each bit, referred as LLR (Log-Likelihood Ratio). The soft output bits may be used by a soft-decoding forward error corrector (e.g. a low-density parity check (LDPC) dedecoder). The soft output bits may be generated using, for example, a Soft Output Viterbi Algorithm (SOVA) or similar. Such algorithms may use additional information of the sequence decoding process including metrics levels of dropped paths and/or estimated bit probabilities for generating the LLR, where $$LLR(b) = \log\left(\frac{P_b}{1-P_b}\right),$$

where $P_b$ is the probability that bit b=1.

In an example implementation, components of the system upstream of the pulse shaper 104 in the transmitter and downstream of the equalizer and sequence estimator 112 in the receiver may be as found in a conventional N-QAM system. Thus, through modification of the transmit side physical layer and the receive side physical layer, aspects of the invention may be implemented in an otherwise conventional N-QAM system in order to improve performance of the system in the presence of non-linearity as compared, for example, to use of RRC filters and an N-QAM slicer.

Figure 2:
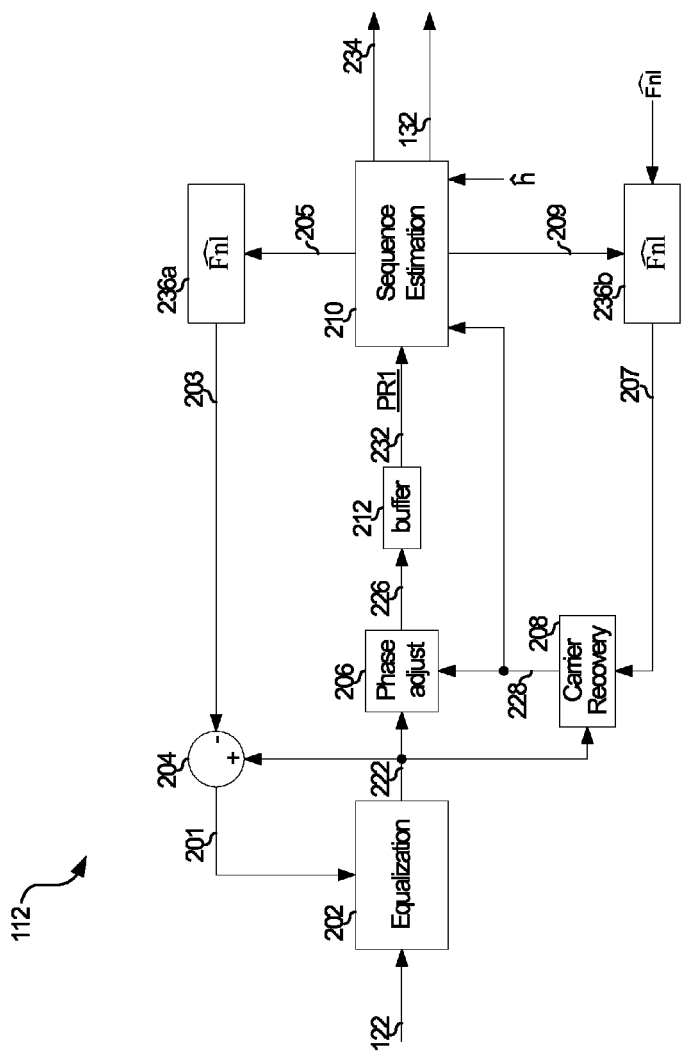
FIG. 2 is a block diagram depicting an example equalization and sequence estimation circuit for use in a system configured for low-complexity, highly-spectrally-efficient communications.

FIG. 2 is a block diagram depicting an example equalization and sequence estimation circuit for use in a system configured for low-complexity, highly-spectrally-efficient communications. Shown are an equalizer circuit 202, a signal combiner circuit 204, a phase adjust circuit 206, a sequence estimation circuit 210, and non-linearity modeling circuits 236a and 236b.

The equalizer 202 may be operable to process the signal 122 to reduce ISI caused by the channel 107. The output 222 of the equalizer 202 is a partial response domain signal. The ISI of the signal 222 is primarily the result of the pulse shaper 104 and the input filter 109 (there may be some residual ISI from multipath, for example, due to use of the least means square (LMS) approach in the equalizer 202). The error signal, 201, fed back to the equalizer 202 is also in the partial response domain. The signal 201 is the difference, calculated by combiner 204, between 222 and a partial response signal 203 that is output by non-linearity modeling circuit 236a. An example implementation of the equalizer is described in the United States patent application titled "Feed Forward Equalization for Highly-Spectrally-Efficient Communications," which is incorporated herein by reference, as set forth above.

The carrier recovery circuit 208 may be operable to generate a signal 228 based on a phase difference between the signal 222 and a partial response signal 207 output by the non-linearity modeling circuit 236b. The carrier recovery circuit 208 may be as described in the United States patent application titled "Coarse Phase Estimation for Highly-Spectrally-Efficient Communications," which is incorporated herein by reference, as set forth above.

The phase adjust circuit 206 may be operable to adjust the phase of the signal 222 to generate the signal 226. The amount and direction of the phase adjustment may be determined by the signal 228 output by the carrier recovery circuit 208. The signal 226 is a partial response signal that approximates (up to an equalization error caused by finite length of the equalizer 202, a residual phase error not corrected by the phase adjust circuit 206, non-linearities, and/or other non-idealities) the total partial response signal resulting from corresponding symbols of signal 103 passing through pulse shaper 104 and input filter 109.

The buffer 212 buffers samples of the signal 226 and outputs a plurality of samples of the signal 226 via signal 232. The signal 232 is denoted PR1, where the underlining indicates that it is a vector (in this case each element of the vector corresponds to a sample of a partial response signal). In an example implementation, the length of the vector PR1 may be Q samples.

Input to the sequence estimation circuit 210 are the signal 232, the signal 228, and a response ĥ. Response ĥ is based on h (the total partial response, discussed above). For example, response ĥ may represent a compromise between h (described above) and a filter response that compensates for channel non-idealities such as multi-path. The response ĥ may be conveyed and/or stored in the form of LTx+LRx−1 tap coefficients resulting from convolution of the LTx tap coefficients of the pulse shaper 104 and the LRx tap coefficients of the input filter 109. Alternatively, response ĥ may be conveyed and/or stored in the form of fewer than LTx+LRx−1 tap coefficients—for example, where one or more taps of the LTx and LRx is ignored due to being below a determined threshold. The sequence estimation circuit 210 may output partial response feedback signals 205 and 209, a signal 234 that corresponds to the finely determined phase error of the signal 120, and signal 132 (which carries hard and/or soft estimates of transmitted symbols and/or transmitted bits). An example implementation of the sequence estimation circuit 210 is described below with reference to FIG. 3.

Figure 3:
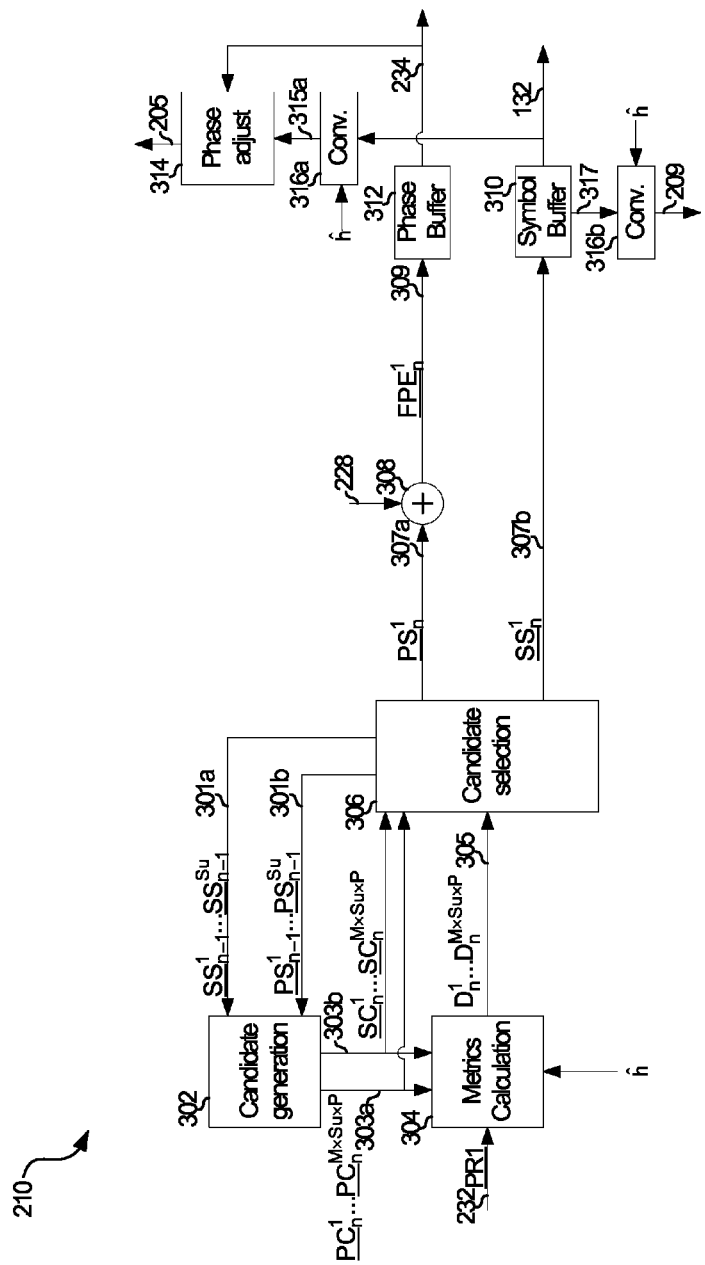
FIG. 3 is a block diagram depicting an example sequence estimation circuit for use in a system configured for low-complexity, highly-spectrally-efficient communications.

The non-linear modeling circuit 236a may apply a non-linearity function $\widehat{Fnl}$ (a model of the non-linearity seen by the received signal en route to the circuit 210) to the signal 205 resulting in the signal 203. Similarly, the non-linear modeling circuit 236b may apply the non-linearity function $\widehat{Fnl}$ to the signal 209 resulting in the signal 207. $\widehat{Fnl}$ may be, for example, a third-order or fifth-order polynomial. Increased accuracy resulting from the use of a higher-order polynomial for $\widehat{Fnl}$ may tradeoff with increased complexity of implementing a higher-order polynomial. Where FnlTx is the dominant non-linearity of the communication system 100, $\widehat{Fnl}$ modeling only FnlTx may be sufficient. Where degradation in receiver performance is above a threshold due to other non-linearities in the system (e.g., non-linearity of the receiver front-end 108) the model $\widehat{Fnl}$ may take into account such other non-linearities FIG. 3 is a block diagram depicting an example sequence estimation circuit for use in a system configured for low-complexity, highly-spectrally-efficient communications. Shown are a candidate generation circuit 302, a metrics calculation circuit 304, a candidate selection circuit 306, a combiner circuit 308, a buffer circuit 310, a buffer circuit 312, a phase adjust circuit 314, and convolution circuits 316a and 316b. The sequence estimation process described with respect to FIG. 3 is an example only. Many variations of the sequence estimation process are also possible. For example, although the implementation described here uses one phase survivor per symbol survivor, another implementation may have PSu (e.g., PSu<Su) phase survivors that will be used commonly for each symbol survivor.

For each symbol candidate at time n, the metrics calculation circuit 304 may be operable to generate a metric vector $D_n^1 \ldots D_n^{M \times Su \times P}$ based on the partial response signal PR1, the signal 303a conveying the phase candidate vectors $PC_n^1 \ldots PC_n^{M \times Su \times P}$, and the signal 303b conveying the symbol candidate vectors $SC_n^1 \ldots SC_n^{M \times Su \times P}$, where underlining indicates a vector, subscript n indicates that it is the candidate vectors for time n, M is an integer equal to the size of the symbol alphabet (e.g., for N-QAM, M is equal to N), Su is an integer equal to the number of symbol survivor vectors retained for each iteration of the sequence estimation process, and P is an integer equal to the size of the phase alphabet. In an example implementation, the size of phase alphabet is three, with each of the three symbols corresponding to one of: a positive shift, a negative phase shift, or zero phase shift, as further described in the United States patent application titled "Fine Phase Estimation for Highly Spectrally Efficient Communications," which is incorporated herein by reference, as set forth above. In an example implementation, each phase candidate vector may comprise Q phase values and each symbol candidate vector may comprise Q symbols.

The candidate selection circuit 306 may be operable to select Su of the symbol candidates $SC_n^1 \ldots SC_n^{M \times Su \times P}$ and Su of the phase candidates $PC_n^1 \ldots PC_n^{M \times Su \times P}$ based on the metrics $D_n^1 \ldots D_n^{M \times Su \times P}$ conveyed as signal 305. The selected phase candidates are referred to as the phase survivors $PS_n^1 \ldots PS_n^{Su}$. Each element of each phase survivors $PS_n^1 \ldots PS_n^{Su}$ may correspond to an estimate of residual phase error in the signal 232. That is, the phase error remaining in the signal after coarse phase error correction via the phase adjust circuit 206. The best phase survivor $PS_n^1$ is conveyed via signal 307a. The Su phase survivors are retained for the next iteration of the sequence estimation process (at which time they are conveyed via signal 301b). The selected symbol candidates are referred to as the symbol survivors $SS_n^1 \ldots SS_n^{Su}$. Each element of each symbol survivors $SS_n^1 \ldots SS_n^{Su}$ may comprise a soft-decision estimate and/or a hard-decision estimate of a symbol of the signal 232. The best symbol survivor $SS_n^1$ is conveyed to symbol buffer 310 via the signal 307b. The Su symbol survivors are retained for the next iteration of the sequence estimation process (at which time they are conveyed via signal 301a). Although, the example implementation described selects the same number, Su, of phase survivors and symbol survivors, such is not necessarily the case. Operation of example candidate selection circuits 306 are described in the United States patent application titled "Low-Complexity, Highly-Spectrally Efficient Communications," which is incorporated herein by reference, as set forth above.

The candidate generation circuit 302 may be operable to generate phase candidates $PC_n^1 \ldots PC_n^{M \times Su \times P}$ and symbol candidates $SC_n^1 \ldots SC_n^{M \times Su \times P}$ from phase survivors $PS_{n-1}^1 \ldots PS_{n-1}^{Su}$ and symbol survivors $SS_{n-1}^1 \ldots SS_{n-1}^{Su}$, wherein the index n−1 indicates that they are survivors from time n−1 are used for generating the candidates for time n. In an example implementation, generation of the phase and/or symbol candidates may be as, for example, described in one or more of: the United States patent application titled "Low-Complexity, Highly-Spectrally Efficient Communications," and the United States patent application titled "Joint Sequence Estimation of Symbol and Phase with High Tolerance of Nonlinearity," which is incorporated herein by reference, as set forth above.

The symbol buffer circuit 310 may comprise a plurality of memory elements operable to store one or more symbol survivor elements of one or more symbol survivor vectors. The phase buffer circuit 312 may comprise a plurality of memory elements operable to store one or more phase survivor vectors.

The combiner circuit 308 may be operable to combine the best phase survivor, $PS_n^1$, conveyed via signal 307a, with the signal 228 generated by the carrier recovery circuit 208 (FIG.

2) to generate fine phase error vector $FPE_n^1$, conveyed via signal 309, which corresponds to the finely estimated phase error of the signal 222 (FIG. 2). At each time n, fine phase error vector $FPE_{n-1}^1$ stored in phase buffer 312 may be overwritten by $FPE_n^1$.

The phase adjust circuit 314 may be operable to adjust the phase of the signal 315a by an amount determined by the signal 234 output by phase buffer 312, to generate the signal 205.

The circuit 316a, which performs a convolution, may comprise a FIR filter or IIR filter, for example. The circuit 316a may be operable to convolve the signal 132 with response ĥ, resulting in the partial response signal 315a. Similarly, the convolution circuit 316b may be operable to convolve the signal 317 with response ĥ, resulting in the partial response signal 209. As noted above, response ĥ may be stored by, and/or conveyed to, the sequence estimation circuit 210 in the form of one or more tap coefficients, which may be determined based on the tap coefficients of the pulse shaper 104 and/or input filter 109 and/or based on an adaptation algorithm of a decision feedback equalizer (DFE). Response ĥ may thus represent a compromise between attempting to perfectly reconstruct the total partial response signal (103 as modified by pulse shaper 104 and input filter 109) on the one hand, and compensating for multipath and/or other non-idealities of the channel 107 on the other hand. In this regard, the system 100 may comprise one or more DFEs as described in one or more of: the United States patent application titled "Decision Feedback Equalizer for Highly-Spectrally-Efficient Communications," the United States patent application titled "Decision Feedback Equalizer with Multiple Cores for Highly-Spectrally-Efficient Communications," and the United States patent application titled "Decision Feedback Equalizer Utilizing Symbol Error Rate Biased Adaptation Function for Highly-Spectrally-Efficient Communications," each of which is incorporated herein by reference, as set forth above.

Thus, signal 203 is generated by taking a first estimate of transmitted symbols, (an element of symbol survivor $SS_n^1$), converting the first estimate of transmitted symbols to the partial response domain via circuit 316a, and then compensating for non-linearity in the communication system 100 via circuit 236a (FIG. 2). Similarly, signal 207 is generated from a second estimate of transmitted symbols (an element of symbol survivor $SS_n^1$) that is converted to the partial response domain by circuit 316b to generate signal 209, and then applying a non-linear model to the signal 209 to compensate for non-linearity in the signal path.

In digital communication systems, such as the example system 100 configured for low-complexity, highly-spectrally-efficient communications, timing synchronization may be achieved by using a blind (non-decision aided) timing detector. Because of the partial response nature of the system 100, the energy at around +/−half the baud rate (i.e., +/−0.5*Fbaud) may be insignificant due to the partial response filtering. Consequently, timing synchronization relying on energy at +/−0.5*Fbaud may become suboptimal, which may degrade demodulator performance. Accordingly, in an example implementation of system 100, timing synchronization may be optimized by injecting (or "inserting") a timing pilot signal at a sub-harmonic of the baud rate into the transmit signal. Corresponding timing recovery and elimination of the injected pilot signal from the received signal may take place in the receiver (e.g., in circuit 110).

Figure 4:
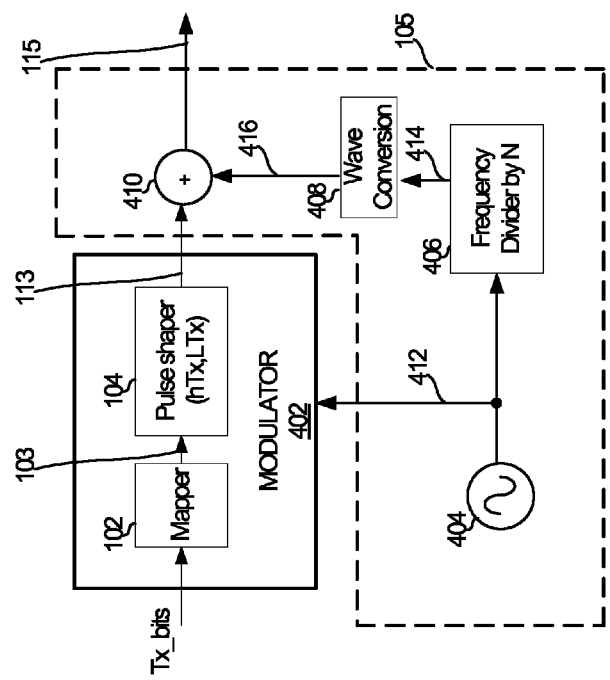
FIG. 4 is a block diagram illustrating an example timing pilot insertion circuit for use in a system configured for low-complexity, highly-spectrally-efficient communications.

FIG. 4 is a block diagram illustrating an example timing pilot insertion circuit for use in a system configured for low-complexity, highly-spectrally-efficient communications. Referring to FIG. 4, there is illustrated a more detailed diagram of the timing pilot insertion circuit 105 in the system 100 of FIG. 1.

The timing pilot insertion circuit 105 may comprise an oscillator 404, a frequency divider 406, a wave conversion block 408, and an adder 410. Also shown is a modulator 402 comprising the mapper 102 and Pulse shaper 104.

The oscillator 404 may comprise suitable circuitry, logic and/or code and may be operable to generate a reference clock signal 412. The frequency of the reference clock signal 412 may be determined to be the rate at which symbols are output by the mapper 102 and/or the rate at which samples are output by the pulse shaper 104.

The frequency divider 406 may comprise suitable circuitry, logic and/or code and may be operable to frequency divide the reference clock signal 412. For example, the frequency divider 406 may frequency divide reference clock signal 412 and generate a timing pilot signal 414 at ±(1/n*Fbaud), where n is a real number. In an example implementation, n is an integer greater than 2. The output of the frequency divider 406 (i.e., signal 414) may be a square-wave signal. In an example embodiment, the frequency divider 406 may be operable to use multiple values of n to generate multiple signals 414 at multiple frequencies (each of which may be a fractional or integer sub-harmonic of the frequency of signal 412). For example, signal 412 may be divided by n1 to generate a first signal 414 and divided by n2 to generate a second signal 414. In such an embodiment, each of n1 and n2 may be integers (e.g., n2 may be an integer multiple of n1).

The wave conversion block 408 may comprise suitable circuitry, logic and/or code and may be operable to convert a square-wave input signal (e.g., the timing pilot signal 414) into a signal that is generally sinusoidal in shape (e.g., timing pilot signal 416). In this regard, the wave conversion block 408 may comprise one or more filters. The output of the block 408 may, for example, be characterized by $\sin(\omega)$ or $\cos(\omega) + j\sin(\omega)$, where $\omega$ is the angular frequency of the signal 414. In case that signal 414 consists of multiple frequencies (generated by multiple dividers by n1, n2, etc. at 406), wave conversion 408 may use multiple converters from square wave to sinusoidal shape signals to provide multiple tones at 416, each of which has a real or complex substantially sinusoidal shape.

The adder 410 may comprise suitable circuitry, logic and/or code and may be operable to add two or more input signals (e.g., signals 113 and 416) to generate an added output signal (e.g., signal 115).

In operation, a plurality of transmit bits (e.g., Tx_bits input) may be mapped to a plurality of symbols using the reference clock signal 412. As explained above in reference to FIG. 1, the mapper 102 may be operable to map bits (e.g., Tx_bits) of the Tx_bitstream to corresponding symbols according to a selected modulation scheme. The pulse shaper 104 may be operable to adjust the waveform of the signal 103 such that, among other considerations, the waveform of the resulting signal 113 complies with the spectral requirements of the channel over which the signal 113 is to be transmitted. The pulse shaper 104 may comprise, for example, an infinite impulse response (IIR) and/or a finite impulse response (FIR) filter.

The reference clock signal 412 may also be communicated to frequency divider 406, and the frequency divider 406 may generate a square-wave timing pilot signal 414. The square-wave timing pilot signal 414 may comprise a tone at ±(1/n*Fbaud), where Fbaud may be the symbol rate associated with the reference clock signal 412 and n is, for example, an integer greater than 2. The square-wave timing pilot signal 414 may then be converted to a timing pilot signal 416 that is generally sinusoidal in shape by the wave conversion block 408. The timing pilot signal 416 may be inserted into the signal 113 by adder 410, resulting in an output signal 115.

The output signal 115 of the timing pilot insertion circuit 105 may thus comprise the signal 113 plus the inserted pilot signal 416 (e.g., a sine wave at 1/n*Fbaud). In this regard, the tone frequency of the pilot signal may be inside the pass band of a receiver input filter (e.g., filter 109) and may be reach the demodulator at the receiver without substantial signal losses. At the receiver, the timing recovery (detector) of the demodulator may detect the injected tone energy, allowing timing synchronization to take place in a stable condition and without excessive noise. Since the injected tone (pilot signal) may degrade performance of the demodulator, the tone (pilot signal) may be cancelled by injecting, at the receiver, an opposite tone based on the timing estimation. In this regard, accurately detecting the timing, and removing, of the inserted timing pilot signal prior to demodulation may prevent insertion of the pilot signal from degrading overall performance of the system 100.

In accordance with an example embodiment of the disclosure, the power of the injected timing pilot signal 416 may be sufficiently low so as to comply with Tx spectrum mask limitations, but high enough to provide energy for Rx timing synchronization in sub-optimal SNR conditions. In this regard, the strength of the timing pilot signal 416 may be controlled by controlling gain in the frequency divider 406, controlling gain in the wave conversion block 408, and/or by introducing a separate gain block (not illustrated in FIG. 4) in the signal path between the oscillator 404 and the adder 410. In an example implementation, this gain may be based on measured characteristics (e.g., SNR, BER, SER, etc.) of the received signal (e.g., as reported back by the receiver via a control channel).

Figure 5:
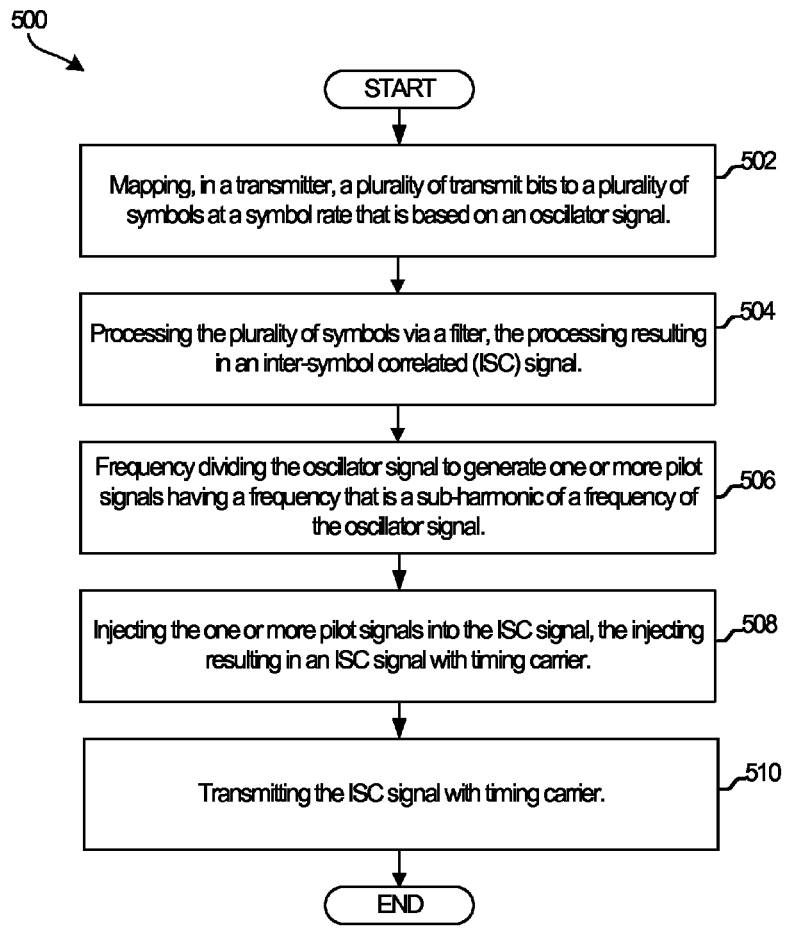
FIG. 5 is a flow diagram of an example method for signal processing in a transmitter for use in a system configured for low-complexity, highly-spectrally-efficient communications.

FIG. 5 is a flow diagram of an example method for signal processing in a transmitter for use in a system configured for low-complexity, highly-spectrally-efficient communications. Referring to FIGS. 1-5, the example method 500 may start at 502, when a plurality of transmit bits are mapped to a plurality of symbols at a symbol rate determined by an oscillator signal 412. The symbols may be N-QAM symbols and N may be an integer. At 504, the plurality of symbols may be processed via a filter (e.g., 104), where the processing may result in an inter-symbol correlated (ISC) signal (e.g., 113). At 506, the frequency divider 406 may frequency divide the oscillator signal 412 to generate one or more pilot signals 414 having a frequency that is a sub-harmonic of a frequency of the oscillator signal 412. More specifically, the oscillator signal 412 may be divided to generate the one or more pilot signals 414 at ±(1/n*Fbaud) frequency, where n may be an integer greater than 2, and Fbaud may be the frequency (symbol rate) of the oscillator signal 412.

The value of n may be selected based on one or both of a spectral mask value and a measured performance indicator associated with a receiver of the transmitted ISC signal with timing carrier. The at least one performance indicator may include at least one of a Signal-to-Noise Ratio (SNR), a Symbol Error Rate (SER), a Bit Error Rate (BER), a measurement indicative of timing error variance, and/or a measurement indicative of accuracy of frequency and/or phase of said one or more pilot signal, of the receiver (e.g., 30) of the ISC signal. The value of n may also be communicated to the receiver (30) during transmitter-receiver pairing of the transmitter (20) with the receiver (30).

The wave conversion block 408 may then convert a square wave profile of the generated pilot signal 414 to a wave profile (e.g., of the output pilot signal 416). At 508, the adder 410 may insert the one or more pilot signals 416 into the ISC signal 113 output by the pulse shaper 104, resulting in signal 115 (the signal 115 being a partial response signal with timing carrier). At 510, the signal 115 may be processed by the front-end 106 (e.g., up-converted to RF and amplified) and transmitted.

The gain of the one or more pilot signals 414 may be adjusted based on a spectral mask value associated with the transmitting. The wave conversion block 408 may convert a square wave profile of the generated one or more pilot signals to a wave profile that is generally sinusoidal, prior to the injecting. The processing may also include filtering the plurality of symbols via a partial response filter (e.g., 104) such that the transmitted ISC signal with timing carrier (115) is a partial response signal. The ISC signal with timing carrier (115) may be upconverted and amplified prior to the transmitting.

Figure 6:
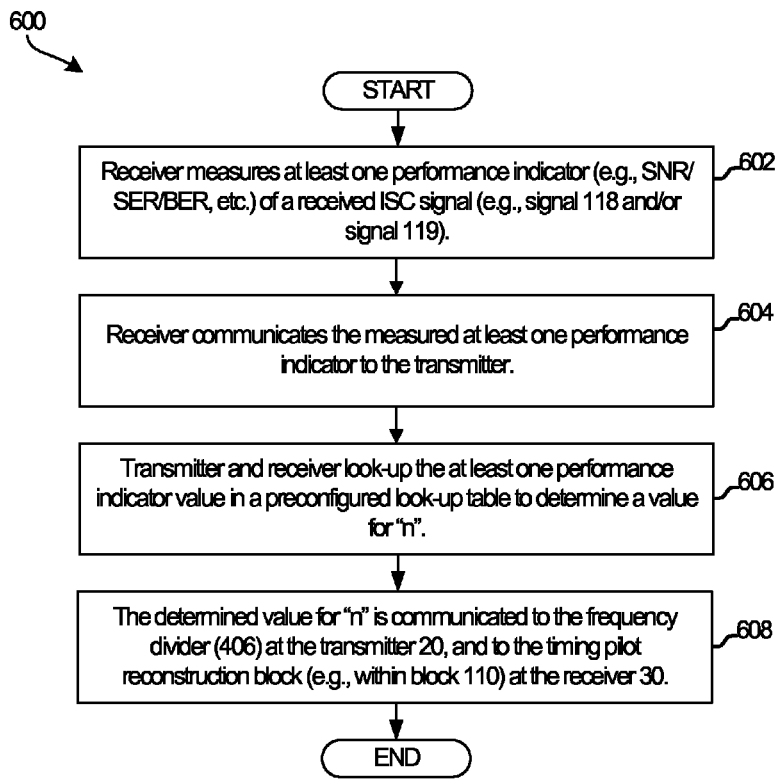
FIG. 6 is a flow diagram of an example method for determining a fraction indicator "n" for generating (at a transmitter) and recovering (at a receiver) a pilot signal comprising a sub-harmonic frequency of an oscillator signal, in accordance with an example embodiment of the disclosure.

FIG. 6 is a flow diagram of an example method for determining a fraction indicator "n" for generating (at a transmitter) and recovering (at a receiver) a pilot signal comprising a sub-harmonic frequency of an oscillator signal, in accordance with an example embodiment of the disclosure. Referring to FIGS. 1-6, the example method 600 may start at 602, when a receiver (e.g., receiver 30 of communication system 100) may measure at least one performance indicator (e.g., Signal-to-Noise Ratio (SNR), Symbol Error Rate (SER), Bit Error Rate (BER), a measurement indicative of timing error variance, a measurement indicative of the accuracy of frequency and/or phase of signal 416, etc.) of a received partial response signal (e.g., signal 118 and/or signal 119). At 604, the receiver 30 may communicate the measured at least one performance indicator value to the transmitter 20. The at least one performance indicator may be used to adapt the injected power level of one or more timing pilot signals at the transmitter. For example, the injected power level of the one or more timing pilot signals may be increased if the transmitter 20 receives an indication of high values for the at least one performance indicator (e.g., high SNR, SER, and/or BER). Alternatively, the injected power level of the one or more timing pilot signals may be decreased if the transmitter 20 receives an indication of low values for the at least one performance indicator (e.g., low SNR, SER, and/or BER).

power is increased if indication of high awgn, ser, ber, etc and decreased if low awgn, ser, ber As explained above, the timing pilot signal may be at ±(1/n*Fbaud), where Fbaud is the symbol rate of the received signal and n is a real number. Put another way, the frequency of the timing pilot signal may be a sub-harmonic of the symbol rate of the received partial response signal (e.g., signal 118 and/or signal 119). Thus, in order to generate the sub-harmonic pilot signal (e.g., 414), the transmitter 20 may need to know the value of "n". Similarly, in order to determine Fbaud from frequency of the timing pilot signal, the receiver 30 may also need to know or determine the value of n.

At 606, the transmitter 20 and the receiver 30 may look-up the SNR/SER value in a preconfigured look-up table (not illustrated in the figures) to determine a value for "n". At 608, the determined value for "n" may be communicated to the frequency divider (406) at the transmitter 20, and to a timing pilot reconstruction block (e.g., a block within the timing pilot removal circuit 110) at the receiver 30. In this regard, the value of n may be known to the receiver 30 based on knowledge of the transmitter 20, from which the receiver intends to receive signals (e.g., based on a look-up table of values of n used by various transmitters (such as transmitter 20), on various channels, and/or for various communication standards).

In other example implementations, the value of n may be known to the receiver 30 based on knowledge of the transmitter 20, from which the receiver intends to receive signals (e.g., based on transmitter-receiver pairing and communication of the value of n from the transmitter to the receiver during the pairing process). Additionally or alternatively, the receiver 30 may determine the value of n based on control information communicated from the transmitter 20 (e.g., using out-of-band signaling).

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Methods and systems disclosed herein may be realized in hardware, software, or a combination of hardware and software. Methods and systems disclosed herein may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out methods described herein. Another typical implementation may comprise an application specific integrated circuit (ASIC) or chip with a program or other code that, when being loaded and executed, controls the ASIC such that is carries out methods described herein.

While methods and systems have been described herein with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising:
   in a transmitter:
   mapping a plurality of transmit bits to a plurality of symbols at a symbol rate that is based on an oscillator signal;
   processing said plurality of symbols, said processing resulting in an inter-symbol correlated (ISC) signal;
   frequency dividing said oscillator signal to generate one or more pilot signals having a corresponding one or more frequencies that are sub-harmonics of a frequency of said oscillator signal;
   injecting said one or more pilot signals into said ISC signal, said injecting resulting in an ISC signal with timing carrier; and
   transmitting said ISC signal with timing carrier.

2. The method according to claim 1, wherein said symbols are N-QAM symbols and N is an integer.

3. The method according to claim 1, comprising:
   adjusting gain of said one or more pilot signals based on a spectral mask value associated with said transmitting.

4. The method according to claim 1, comprising:
   frequency dividing said oscillator signal to generate each one of said one or more pilot signals at $\pm(1/n*Fbaud)$, wherein:
   n is an integer greater than 2 and is different for each of said one or more pilot signals; and
   Fbaud is a symbol rate of said oscillator signal.

5. The method according to claim 1, wherein said processing comprises filtering said plurality of symbols via a partial response filter such that said transmitted ISC signal with timing carrier is a partial response signal.

6. The method according to claim 1, comprising:
   upconverting and amplifying said ISC signal with timing carrier prior to said transmitting.

7. The method according to claim 4, comprising:
   selecting n based on one or both of a spectral mask value and a measured performance indicator associated with a receiver of said transmitted ISC signal with timing carrier, wherein said at least one performance indicator comprises at least one of a Signal-to-Noise Ratio (SNR) of said receiver of said transmitted ISC signal with timing carrier, a Symbol Error Rate (SER) of said receiver of said transmitted ISC signal with timing carrier, a Bit Error Rate (BER) of said receiver of said transmitted ISC signal with timing carrier, a measurement indicative of timing error variance of said receiver of said transmitted ISC signal with timing carrier, and/or a measurement indicative of accuracy of frequency and/or phase of said one or more pilot signals in said receiver of said transmitted ISC signal with timing carrier.

8. The method according to claim 4, comprising:
   converting a square wave profile of said generated one or more pilot signals to a wave profile that is generally sinusoidal, prior to said injecting.

9. The method according to claim 7, comprising:
   adjusting power of said one or more pilot signals based on said measured performance indicator associated with said receiver.

10. The method according to claim 7, comprising:
    communicating to the receiver, the selected n during transmitter-receiver pairing of said transmitter with said receiver.

11. A transmitter, comprising:
    a modulator comprising a mapper and a filter;
    a pilot insertion circuit; and
    a front-end circuit, wherein:
    said mapper is operable to map a plurality of transmit bits to a plurality of symbols at a symbol rate that is based on an oscillator signal;
    said filter is operable to process said plurality of symbols, said processing resulting in an inter-symbol correlated (ISC) signal;
    said pilot insertion circuit is operable to frequency divide said oscillator signal to generate one or more pilot signals having a corresponding one or more frequencies that are sub-harmonics of a frequency of said oscillator signal;
    said pilot insertion circuit is operable to inject said one or more pilot signals into said ISC signal, said injecting resulting in an ISC signal with timing carrier; and
    said front-end circuit is operable to transmit said ISC signal with timing carrier.

12. The transmitter according to claim 11, wherein said symbols are N-QAM symbols and N is an integer.

13. The transmitter according to claim 11, wherein said pilot insertion circuit is operable to adjust gain of said one or more pilot signals based on a spectral mask value associated with said transmitting.

14. The transmitter according to claim 11, wherein said pilot insertion circuit comprises:
- an oscillator, said oscillator operable to generate said oscillator signal; and
- a frequency divider, said frequency divider operable to frequency divide said oscillator signal to generate each one of said one or more pilot signals at $\pm(1/n*Fbaud)$, wherein:
  - n is an integer greater than 2 and is different for each of said one or more pilot signals; and
  - Fbaud is a symbol rate of said oscillator signal.

15. The transmitter of claim 11, wherein said filter is a partial response filter and said transmitted ISC signal with timing carrier is a partial response signal.

16. The transmitter according to claim 11, comprising:
- front-end circuitry operable to upconvert and amplify said ISC signal with timing carrier prior to said transmitting.

17. The transmitter according to claim 13, wherein said pilot insertion circuit comprises:
- a wave conversion block operable to convert a square wave profile of said generated one or more pilot signals to a wave profile that is generally sinusoidal, prior to said injecting.

18. The transmitter according to claim 14, wherein:
- n is based on one or both of a spectral mask value and a measured performance indicator associated with a receiver of said transmitted ISC signal with timing carrier, wherein said at least one performance indicator comprises at least one of a Signal-to-Noise Ratio (SNR) of said receiver of said transmitted ISC signal with timing carrier, a Symbol Error Rate (SER) of said receiver of said transmitted ISC signal with timing carrier, a Bit Error Rate (BER) of said receiver of said transmitted ISC signal with timing carrier, a measurement indicative of timing error variance of said receiver of said transmitted ISC signal with timing carrier, and/or a measurement indicative of accuracy of frequency and/or phase of said one or more pilot signals in said receiver of said transmitted ISC signal with timing carrier.

19. The transmitter according to claim 18, comprising:
- circuitry operable to adjust power of said one or more pilot signals based on said measured performance indicator associated with said receiver.

20. The transmitter according to claim 18, comprising:
- circuitry operable to communicate to the receiver, the selected n during transmitter-receiver pairing of said transmitter with said receiver.

\* \* \* \* \*